Figure 1:
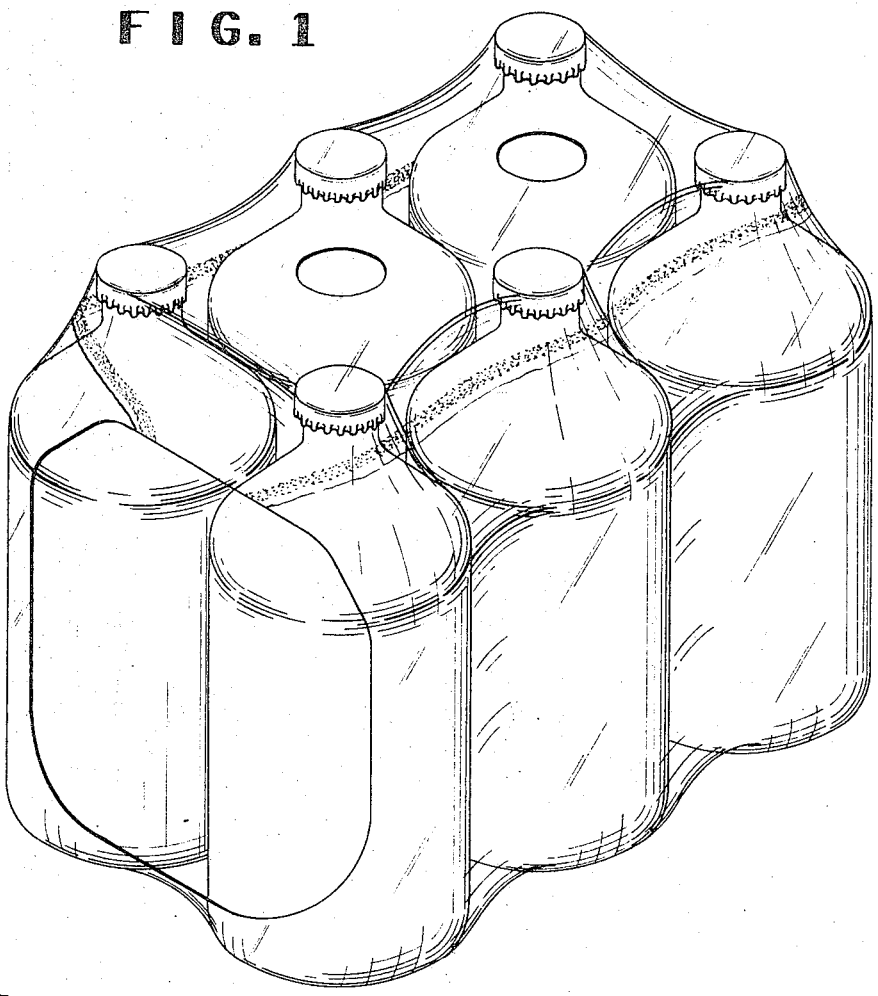
Figure 2:
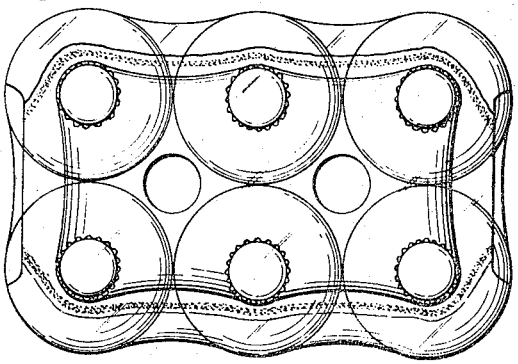
Figure 3:
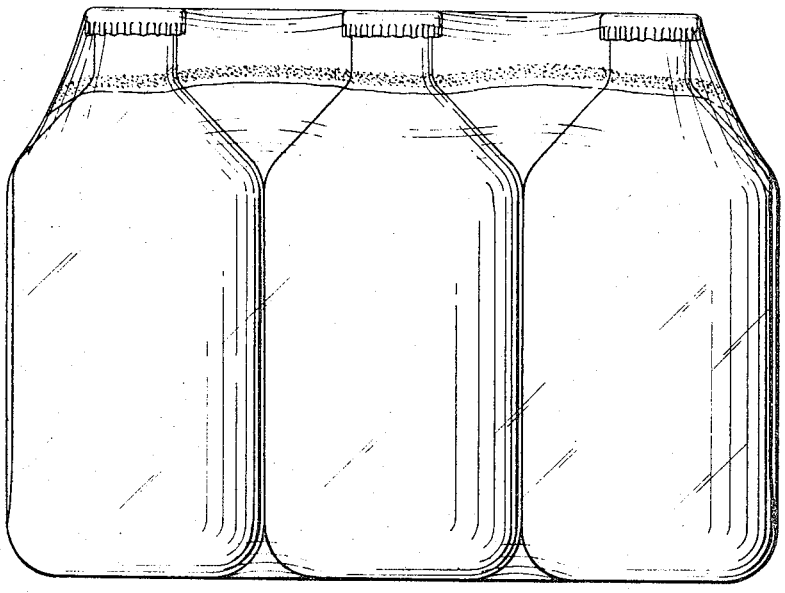

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 13

T883,019

BOTTLE PACKAGE OR SIMILAR ARTICLE

Joseph Daniel Greenwell, Wilmington, Del., assignor to E. I. du Pont de Nemours and Company, Wilmington, Del., a corporation of Delaware

Continuation of design application Ser. No. 14,124, Oct. 23, 1968. This application Feb. 27, 1970, Ser. No. 21,666

**Int. Cl. D9—*99***

U.S. Cl. D9—176

2 Sheets Drawing. 3 Pages Specification

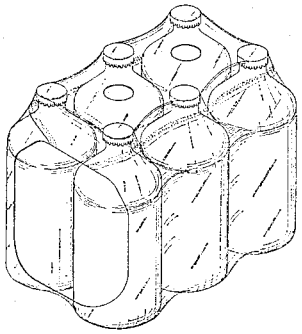

The design relates to a bottle package or similar article, substantially as shown.

Feb. 2, 1971 J. D. GREENWELL T883,019

BOTTLE PACKAGE OR SIMILAR ARTICLE

Original Filed Oct. 23, 1968 2 Sheets-Sheet 1

INVENTOR
JOSEPH DANIEL GREENWELL

Claude S. Beaudoin
ATTORNEY

Feb. 2, 1971 J. D. GREENWELL T883,019

BOTTLE PACKAGE OR SIMILAR ARTICLE

Original Filed Oct. 23, 1968 2 Sheets-Sheet 2

INVENTOR
JOSEPH DANIEL GREENWELL

BY Charles T. Beaudoin
ATTORNEY